United States Patent [19]

Emmons et al.

[11] 4,311,624

[45] Jan. 19, 1982

[54] AUTOXIDIZABLE COMPOSITIONS

[75] Inventors: William D. Emmons, Huntingdon Valley; Fred A. Kaplan, North Wales, both of Pa.

[73] Assignee: Rohm and Haas Company, Philadelphia, Pa.

[21] Appl. No.: 165,878

[22] Filed: Jul. 2, 1980

[51] Int. Cl.$^3$ .............................................. C08L 91/00
[52] U.S. Cl. ............................. 260/22 CB; 260/18 R; 260/18 PF; 260/22 R; 260/22 TN; 260/22 EP; 260/22 D; 260/22 CA; 260/23 TN; 260/23 CP; 260/23 AC; 260/23 AR; 260/23 XA; 260/23.7 R; 260/23.7 N; 260/23.7 H; 427/388.2; 428/463; 428/522; 526/320
[58] Field of Search ............ 260/18 R, 18 PF, 22 R, 260/22 D, 22 EP, 22 CQ, 22 T, 22 TN, 23.7 H, 23 AC, 23 AR, 23 TN, 23 CP, 22 CA, 23 XA, 23.7 N, 23.7 R; 526/319, 320, 282; 428/458, 463, 522; 427/388.2

[56] References Cited

U.S. PATENT DOCUMENTS

| | | | |
|---|---|---|---|
| 3,284,385 | 11/1966 | D'Alelio | 260/23 AR |
| 4,100,120 | 7/1978 | Maekawa et al. | 260/22 CB |
| 4,138,390 | 2/1979 | Emmons et al. | 260/45.9 L |
| 4,144,212 | 3/1979 | Linder et al. | 526/282 X |
| 4,145,503 | 3/1979 | Emmons et al. | 526/171 X |
| 4,225,473 | 9/1980 | Heiberger | 260/22 CB |

*Primary Examiner*—Michael R. Lusignan
*Assistant Examiner*—Thurman K. Page
*Attorney, Agent, or Firm*—Lester E. Johnson

[57] ABSTRACT

Disclosed is an improved autoxidizable coating and/or impregnating composition containing (1) a reactive non-volatile diluent monomer system of a mixture of dicyclopentenyloxyalkyl esters of polymerizable ethylenically unsaturated carboxylic acids and methacryloxyalkyl esters of drying or semi-drying oil fatty acids (2) a film-forming component which contains autoxidizable functionality, (3) a polyvalent metal containing salt or complex that catalyzes the autoxidative curing of (1) and (2), and, optionally, (4) a volatile oxime stabilizer.

20 Claims, No Drawings

AUTOXIDIZABLE COMPOSITIONS

BACKGROUND OF THE INVENTION

1. Field of the Invention

This invention relates to high solids coating and/or impregnating compositions containing a film-forming component and a reactive diluent, curable at ambient conditions. Interest in the preservation of the environmental quality and in the conservation of energy, manifested by governmental implementation of increasingly stringent anti-pollution and energy conservation regulations, has generated considerable interest in the use of reactive diluents in coating compositions. These diluents are generally high boiling, low viscosity monomers that function as solvents during application but undergo cure of some kind, especially preferably under ambient conditions, and thereby become an integral part of the product coating. Pollution attributable to conventional solvent emissions is thereby reduced or eliminated and the necessity of a source of heat to evaporate solvent from the applied coating composition and to effect cure thereof is also thereby obviated.

2. Description of the Prior Art

Emmons, Nyi and Sperry, U.S. Pat. No. 4,071,489 issued Jan. 31, 1978 discloses air-drying coating compositions based on alkyd resins comprising at least one of dicyclopentenyl methacrylate or dicyclopentenyl acrylate, and a polyester or an alkyd resin having at least one unsaturated component curable by the addition thereto of a drier or a siccative, the composition optionally containing a volatile oxime stabilizer to prevent the oxidizing action of the drier when it is included in the composition prior to storage.

Emmons, Nyi and Sperry, U.S. Pat. No. 4,100,133 issued July 11, 1978 discloses autoxidizable compositions comprising at least one of dicyclopentenyl methacrylate or dicyclopentenyl acrylate, a copolymer containing at least one of dicyclopentenyl methacrylate and dicyclopentenyl acrylate, a siccative, and a volatile oxime stabilizer. The patent also discloses cured film products thereof.

Emmons, Nyi and Sperry, U.S. Pat. No. 4,138,390 issued Feb. 6, 1979 discloses autoxidizable compositions comprising at least one of dicyclopentenyl methacrylate and dicyclopentenyl acrylate, a film-forming polymeric binder, a drier, and a volatile oxime stabilizer. The patent also discloses air-dried film products thereof.

Emmons and Nyi, U.S. Pat. No. 4,097,677 issued June 2, 1978 discloses, as reactive non-volatile monomers, dicyclopentenyloxyalkyl methacrylate and dicyclopentenyloxyalkyl acrylate which are useful in the production of polymers, in coating and/impregnating compositions, and/or in molding, casting, or otherwise forming shaped articles.

Emmons and Nyi, U.S. Pat. No. 4,145,503 issued Mar. 20, 1979, and U.S. Ser. No. 908,427 filed May 22, 1978 now U.S. Pat. No. 4,261,872, which is a continuation-in-part of the application which issued as the aforementioned patent, disclose coating and/or impregnating compositions, curable by autoxidation, of at least one of dicyclopentenyloxyalkyl methacrylate or dicyclopentenyloxyalkyl acrylate, a drying oil or a film-forming addition or condensation polymer, a siccative, and, optionally, a volatile oxime stabilizer.

Barrett and Strain, U.S. Pat. No. 2,160,532 issued May 30, 1939, disclose the preparation of monomeric mixed esters of polyhydric alcohols such as diols, glycols, and the like with monocarboxylic acids, at least one of which is an alpha, beta-unsaturated acid, for example methacrylic acid, the other acids being fatty acids. Specifically disclosed are soybean oil diglyceride monomethacrylate, soybean oil monoglyceride dimethacrylate, glycol laurate methacrylate and related materials. These are used in coatings with peroxide initiators or metal salt driers or with other resins.

D'Alelio, U.S. Pat. No. 3,284,385 issued Nov. 8, 1966, discloses a preparation and an anionic polymerization of methacryloxyethyl and acryloxyethyl esters of drying oil fatty acids, for example linseed oil fatty acid, obtained by direct esterification or transesterification of the corresponding fatty acid monoethoxylates.

Harrison, U.S. Pat. No. 2,593,444 issued Apr. 22, 1952 discloses acrylate and methacrylate esters of unsaturated alcohols derived by the reduction of drying oil and semi-drying oil fatty acids.

In the related, co-pending application U.S. Ser. No. 014,676 filed Feb. 23, 1979 and now U.S. Pat. No. 4,255,196, by Emmons, Sperry, and Kaplan, there are disclosed ink compositions containing drying oil fatty acid esters of addition polymerizable ethylenically unsaturated hydroxyl-containing compounds, especially acryloxyalkyl and methacryloxyalkyl esters of drying oil fatty acids.

Although the use of the dicyclopentenyloxyalkyl methacrylates and the methacryloxyalkyl and acryloxyalkyl esters of drying oil fatty acids would present improvements in the class of reactive diluent monomers, further improvement is desired. In some applications, especially those conducted at ambient temperature, i.e. 0°–100° F., dicyclopentenyloxyalkyl methacrylate, for example dicyclopentenyloxyethyl methacrylate, and compositions based thereon cure more slowly than is desirable. This slow cure rate is believed to be caused, in part, by oxygen inhibition of homopolymerization, a phenomenon well established with methacrylate monomers as reported by F. R. Mayo and A. A. Miller, *J. Am. Chem. Soc.*, 80, 2493 (1958). While oxygen is needed by the methacrylate monomer to form the hydroperoxide requisite for homopolymerization, excessively high oxygen concentration results in the slow formation of a copolymer containing alternating units of oxygen and the methacrylate monomer rather than in rapid homopolymerization of the methacrylate monomer. In order to overcome the slow cure rate of methacrylate monomer-containing systems, it is often necessary to add polymerization accelerators such as peroxides or hydroperoxides to compositions containing monomers such as dicyclopentenyloxyalkyl methacrylate. This, however, generally diminishes the storage stability of such systems.

A problem frequently encountered with the use of methacryloxyalkyl and acryloxyalkyl esters of drying oil fatty acids is that polymers of these monomers are more soft and extensible than is desirable.

SUMMARY OF THE INVENTION

It has surprisingly and unexpectedly been discovered that the use of methacryloxyalkyl and/or acryloxyalkyl esters of drying oil or semi-drying oil fatty acids synergistically enhances the autoxidative cure of dicyclopentenyloxyalkyl methacrylates or dicyclopentenyloxyalkyl acrylates, under ambient conditions, both in bulk and in a wide variety of coating and/or impregnating compositions wherein the monomers are used in combination as a reactive diluent monomer system. Furthermore, the combination of monomers in the reactive diluent monomer system provides coating compositions characterized by a broad range of useful properties, especially surface and physical-mechanical properties, not realizable with the use of either of the respective classes of monomers alone. Also, the use of the combination of the respective classes of monomers provides marked improvement in storage stability in coating and/or impregnating compositions thereof.

Accordingly, the invention comprises an improved autoxidizable coating and/or impregnating composition containing:

(1) from about 5% to about 75% by weight, based on the total of components (1) and (2), of a reactive, non-volatile, diluent monomer system comprising
   (a) from about 1% to about 99% by weight of monomer system of at least one member selected from the group consisting of dicyclopentenyloxyalkyl esters of a polymerizable ethylenically unsaturated monocarboxylic or dicarboxylic acid, and
   (b) from about 1% to about 99% by weight of monomer system of at least one member selected from the group consisting of methacryloxyalkyl and acryloxy alkyl esters of a drying oil, or a semi-drying oil, fatty acid;

(2) from about 95% to about 25% by weight, based on the total of components (1) and (2) of a film-forming component selected from the group consisting of
   (a) drying oils per se,
   (b) alkyd resins having autoxidative functionality,
   (c) vinyl addition polymers with drying oil functionality,
   (d) film-forming binders lacking any appreciable inherent autoxidizable functionality, and
   (e) condensation polymers modified with acrylate or methacrylate functionality;

(3) an effective amount of a polyvalent metal-containing complex or salt that catalyzes the autoxidative curing of components (1) and (2), and, optionally, (4) a volatile oxime stabilizer.

In another aspect, the invention comprises cured articles, such as films, obtained by the autoxidation, in the presence of oxygen, of a composition according to the invention.

The reactive, non-volatile, diluent monomer system comprises two essential components, each of which is present in an amount from about 1% to 99% by weight of monomer system. Component (1) (a) is a monomeric compound of the class defined by the general formula I:

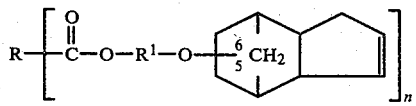

wherein n is 1 or 2, and R, when n is 1, represents the unsaturated hydrocarbon residue of a monocarboxylic ethylenically unsaturated acid, for example, acrylic acid, methacrylic acid, and crotonic acid or, when n is 2, the ethylenically unsaturated hydrocarbon residue of a dicarboxylic acid, for example, itaconic acid, fumaric acid, maleic acid, or alpha-methylene glutaric acid, and $R_1$ represents an alkylene group having 2-12 preferably 2-6, carbon atoms or an oxaalkylene group having 4-12 carbon atoms and having one or more oxygen atoms joining distinct segments of the alkylene groups, each such segment having at least 2 carbon atoms. The ester-ether chain may be connected to either the 5-position or 6-position of the ring nucleus as is indicated in the structural formula I. In fact, the product may comprise a mixture of the two compounds in which part of the ester-ether chain is substituted in the 5-position and part is in the 6-position.

The preferred dicyclopentenyloxyalkyl esters are those derived from acrylic acid or methacrylic acid, represented by the formula II:

wherein the R group in the formula I is $CH_2=C(R^2)-$ wherein $R^2$ is H or $CH_3$. Most preferably, this component comprises dicyclopentenyloxyethyl methacrylate, according to formula II, wherein $R^2$ is $CH_3$ and $R^1$ is $-CH_2CH_2-$.

The methacryloxyalkyl or acryloxyalkyl ester of a drying oil or a semi-drying oil fatty acid, component (1) (b), is a monomeric compound of the class defined by the general formula III:

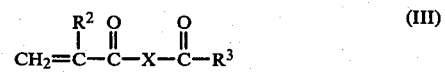

wherein $R^2$ is H or $CH_3$ as defined above, $R^3$ is an aliphatic, preferably linear, hydrocarbyl radical having 11-23 carbon atoms and containing at least one ethylenic double bond, or mixtures thereof, $R^3$ being free of terminal ethylenic bonds, and X represents the group $-OR^4O-$ in which $R^4$ is an aliphatic or cycloaliphatic hydrocarbon residue containing from 2-10 carbon atoms or a $-O(CH_2CHR^5O)m-$ in which $R^5$ is H or $CH_3$ and m is an integer of from 2-10, or mixtures thereof. Preferably, this component comprises the esterification product of drying oil or semi-drying oil fatty acids such as those obtainable from tung oil, safflower oil, soybean oil, tall oil and dehydrated castor oil with polymerizable ethylenically unsaturated hydroxy-containing compounds such as, for example, 2-hydroxyethyl acrylate or methacrylate, 3-hydroxypropyl acrylate or methacrylate, 3-hydroxypropyl crotonate, di(2-hydroxyethyl) maleate and fumarate, and the like. Conjugated modified drying oil fatty acids may also be esterified to provide component 1 (b). Especially preferred is the esterification product of 2-hydroxyethyl methacrylate and linseed oil fatty acids wherein $R^2$ is $CH_3$, $R^3$ is the hydrocarbyl residue of a mixture of, predominantly, oleic, linoleic, and linolenic acids, and X is $-OCH_2CH_2O-$.

It should be noted that commercially available monomers comprising this component may contain small amounts of other materials including the methacryloxyethyl and acryloxyethyl esters of saturated fatty acids, mono- and diesters derived from ethylene glycol and the various saturated and unsaturated drying or semi-drying oil fatty acids, and crosslinking compounds such as ethylene glycol di(meth)acrylate.

As is mentioned above, the reactive, non-volatile, diluent monomer system can comprise from about 5% to about 75% by weight of the total composition, preferably from about 25% to about 60% by weight of the total composition. The ratio of component (1) (a) to component (1) (b) can vary from 1:99 to 99:1 on a weight basis. The precise monomer ratio selected for any given application depends upon a number of factors including compatibility of the respective monomers with polymeric compounds and necessary coating properties. Increasing the level of component (1) (a), for example will improve coating hardness whereas increasing the level of component (1) (b) will improve coating flexibility and toughness.

By the expression "non-volatile" or "essentially non-volatile" as applied to the reactive, diluent monomer, it is intended herein that the reactive monomer or mixture thereof must have a vapor pressure-reactivity balance under the conditions of cure, ambient or force-dry, such that no more than about 5% by weight of reactive monomer is lost by evaporation during cure of the film coatings formed from the compositions of the invention.

As the film-forming component of the autoxidizable composition of the invention, there may be used:

(a) one or more drying oils per se, such as linseed oil, safflower oil, soybean oil, tung oil, dehydrated castor oil, oiticica oil, menhaden oil or the like, or mixtures of such oils, which have inherent autoxidizable functionality that operates in the presence of a siccative or drier;

(b) alkyd resins of certain unsaturated types having autoxidative functionality and oil-free polyesters having maleate or fumarate functionality;

(c) thermoplastic vinyl addition polymers with olefin unsaturation having autoxidixable characteristics and having molecular weights ranging from about 500-15,000 amu (atomic mass units, CRC Handbook of Chemistry and Physics, 54th ed., 1973-1974, page F-79), i.e. those having such autoxidizable functionality in the backbone or as a pendant group, for example, (1) Vinyl polymers having allylic functionality, herein defined generically as

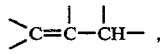

specific examples including copolymers of dicyclopentenyl (meth)acrylate, allyl acrylate or allyl methacrylate, generically represented as allyl (meth)acrylate, butadiene, or allyl cellosolve (meth)acrylate; also the soluble, fusible, uncrosslinked vinyl addition polymers and copolymers of a monomer of formula I, including those of dicyclopentenyloxyalkyl (meth)acrylates, and (2) Vinyl polymers with pendant drying oil functionality, such as those disclosed in Kottke U.S. Pat. No. 3,759,915, Hopwood et al, U.S. Pat. No. 3,590,016, and R. W. Novak and B. B. Kine application Ser. No. 751,507 filed Dec. 17, 1976 now abandoned, and entitled "Water-Soluble Air-Oxidizing Acrylic Coatings;"

(d) film-forming polymeric binders lacking any appreciable inherent autoxidizable functionality and having molecular weight in the range of from about 20,000 amu to about 350,000 amu selected from the group of (i) Thermoplastic vinyl addition polymers of one or more monomers consisting of monoethylenically unsaturated monomers having a single unsaturated group of the formula

such as polyvinyl chloride, (2) Polyvinyl acetals, especially polyvinyl butyral obtained by reacting a polyvinyl acetate under hydrolytic conditions with an aliphatic ($C_2$–$C_8$) aldehyde, such as acetaldehyde and butyraldehyde and the like, and (3) Chlorinated polyisoprenes containing about 64-65% by weight of chlorine, commonly called chlorinated rubber, and (e) Film-forming condensation polymers modified with acrylate or methacrylate functionality as end groups or pendant groups, e.g., (1) Isocyanate prepolymers having no free NCO groups, e.g., those from polyethers or polyesters and an organic polyisocyanate coupled with a hydroxyalkyl acrylate or methacrylate, (2) Acrylic acid or methacrylic acid esters of hydroxy-terminated polyethers or polyesters, (3) Resin-forming diepoxides (epoxy resins) having acrylic acid or methacrylic acid added across the epoxy double bonds, (4) The acrylate or methacrylate functional polyesters formed from epoxidized oils (e.g., soybean oil) and acrylic or methacrylic acid.

The final required component of the autoxidizable composition is that commonly called a drier or siccative or mixture thereof and it is used in an amount effective to autoxidatively cure components (1) and (2). This component may be any polyvalent metal-containing complex or salt that catalyzes the oxidative curing of drying oils or drying oil-modified alkyd resin. Examples of the driers are various polyvalent metal salts including calcium, copper, zinc, manganese, lead, cobalt, iron, vanadium, and zirconium as the cation. Simple inorganic salts are useful such as the halide, chloride, nitrate, and sulfate. However, in circumstances where the vehicle is of an organic nature, it is frequently preferred to use salts of organic acids such as the acetylacetonate, acetate, propionate, butyrate and the like. The driers may also be complex reaction products of metal oxides, acetates, or borates and vegetable oils. Generally, the most useful driers are salts of naphthenic acids or of ($C_8$–$C_{30}$) aliphatic acids. Examples of the polyvalent metal include calcium, copper, zinc, manganese, lead, cobalt, iron, vanadium, and zirconium. Examples of the aliphatic or fatty acid component, or anion, of the drier are naphthenic acids, resinic acids, (that is, rosin acids), tall oil fatty acids, linseed oil fatty acids, 2-ethylhexanoic acid, lauric acid, palmitic acid, myristic acid, stearic acid, oleic acid, linoleic acid, linolenic acid, behenic acid, cerotic acid, montanic acid, and abietic acid. Preferred drier salts are those of cobalt and manganese, such as cobalt octoate, cobalt naphthenate, manganese octoate and manganese naphthenate. Mixtures of various driers mentioned in "Encyclopedia of Chemical Technology," Kirk-Othmer, Volume 5, pages 195–205, published by Interscience Encyclopedia, Inc., N.Y. (1950) may be used.

A fourth, optional component of the autoxidizable composition of the invention is a volatile stabilizer or inhibitor, such as a volatile ketone-oxime or aldehyde-oxime. Specific examples are methyl ethyl ketone-oxime, methyl butyl ketone-oxime, 5-methyl-3-heptanone-oxime, cyclohexanone-oxime, and butyraldehyde-oxime. Addition of such inhibitors is essential if long stability and pot life of the blends of components (1), (2) and (3) is desired.

The proportion of the drier may be quite low and is generally used in the amount of 0.0005 to 2% metal content by weight of (1)+(2). The drier may be added to the composition prior to storage provided such addition is made in the absence of oxygen, or a volatile stabilizer (4) is included in the composition to inhibit or prevent the oxidizing action of the drier and the composition is placed in closed storage containers to prevent volatilization of the inhibitor. The stabilizer may be used in a small proportion of 0.1% to 2% by weight based on the weight of components (1)+(2).

In addition to the required components of the autoxidizable compositions of the invention and the optional volatile oxime stabilizer component, there may also be included in the compositions other additives such as pigments, fillers, rheology control agents, pigment dispersing agents and other typical additives as will become apparent to those skilled in the art, depending upon the requirements of the specific application intended.

Although the precise mechanisms for the remarkable and unexpected cure rate enhancement and enhanced storage stability have not been identified with certainty and are not fully understood, several possible explanations can be envisioned. A mechanism for the oxygen inhibition of methacrylate monomer homopolymerization has already been suggested in the art. See F. R. Mayo and A. A. Miller, *J. Am. Chem. Soc.*, 80, 2493 (1958), mentioned above. The following three equations, 1-3, represent the relatively slow formation of a copolymer containing alternating units of oxygen and methacrylate monomer which competes with the relatively rapid homopolymerization represented in equation (4).

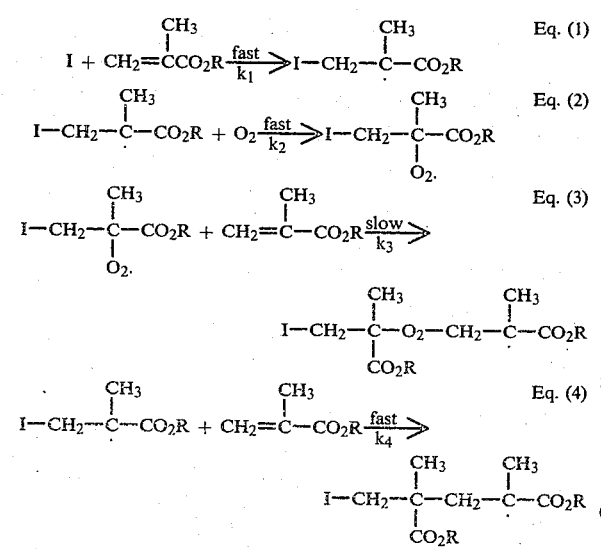

where $k_2 > k_4$
I = free radical initiator
$CH_2=CCO_2R$ = methacrylate monomer
(with $CH_3$ substituent)

When, in the case the methacrylate monomer in the aforementioned equations is, for example, dicyclopentenyloxyethyl methacrylate, the oxygen concentration becomes too high, the products of equations (2) and (3) begin to become competitive with the product of equation (4) and the inhibition phenomenon becomes particularly noticeable at or near the air/coating interface where oxygen concentrations are highest. Consequently, coating compositions based on dicyclopentenyloxyethyl methacrylate are considered to typically cure from the "bottom-up" under ambient conditions and the resulting cured coatings exhibit less than optimum surface cure as manifested by poor print and mar resistance.

In contrast, in the case the methacrylate monomer in the aforementioned equations is, for example, the methacryloxyethyl ester of linseed oil fatty acids, which monomer is considered to be much more efficient at absorbing oxygen than dicyclopentenyloxyethyl methacrylate, the reaction of equation (4) is much more rapid than the reactions of equations (2) and (3) and oxidative cure of coating compositions based on the methacryloxyethyl ester of linseed oil fatty acids are considered to begin at the air/coating interface and proceed from the "top-down".

Accordingly, one possible mechanism for the cure rate enhancement of mixtures of the monomers, dicyclopentenyloxyethyl methacrylate and the methacryloxyethyl ester of linseed oil fatty acids, is that very rapid oxygen depletion occurs in this mixture, thereby creating sufficiently anaerobic conditions to produce advantageous methacrylate monomer homopolymerization.

Alternatively, because the methacryloxyethyl ester of linseed oil fatty acids absorbs oxygen efficiently and forms hydroperoxides very readily, and these hydroperoxides are easily decomposed to free radicals in the presence of the polyvalent metal-containing complexes or salts used in the compositions of the invention, it is possible that a higher free radical flux is generated in mixtures of these monomers, methacryloxyethyl ester of linseed oil fatty acids and dicyclopentenyloxyethyl (meth)acrylate, than in the latter monomer alone and that this higher free radical flux, in part, operates to reduce oxygen inhibition of (meth)acrylate homopolymerization.

Evidence supporting these proposed mechanisms is provided by experiments wherein thin films of coatings containing these monomers in varying proportions, on an inert matrix, and 0.1% cobalt naphthenate are exposed to oxygen at ambient temperature to cure. When the monomer consists entirely of dicyclopentenyloxyethyl methacrylate, 2-4 days is required for cure and the monomer is converted, predominantly, to a copolymer containing alternating units derived from oxygen and monomer as determined by elemental and spectral analysis. When the monomer component consists of dicyclopentenyloxyethyl methacrylate and increasing proportions of the methacryloxyethyl ester of linseed oil fatty acids, the time required for cure of the monomers increasingly diminishes and progressively smaller percentages of the oxygen/methacrylate monomer unit copolymer are formed. These data are summarized in Table 1 below.

TABLE 1

Monomer Component Cure Rate and Polymerization

| Monomer Component Composition (wt. %) | Approx. Cure Time (hrs.) | % Monomer Incorporated as Oxygen/Monomer Copolymer |
|---|---|---|
| A(100) | 48–96 | about 90 |
| A(90)/B(10) | 48–72 | about 60 |
| A(70)/B(30) | 16 | about 10 |
| A(50)/B(50) | 8 | less than 10 |

A = dicyclopentenyloxyethyl methacrylate
B = methacryloxyethyl ester of linseed oil fatty acids As in the case of cure enhancement, the precise mechanisms for the enhanced storage stability achieved by the invention are uncertain and not fully understood. In one aspect, by eliminating the need for the addition of oxidative polymerization accelerators to the coating compositions, the use of mixtures of reactive diluent monomers, for example, the methacryloxyethyl ester of linseed oil fatty acids with dicyclopentenyloxyethyl methacrylate, indirectly affords improved storage stability of compositions containing such monomer mixtures. It is believed, also, that the former monomer directly enhances composition storage stability by operating as a polymerization inhibitor with respect to the latter monomer, under the essentially anaerobic conditions of bulk storage, probably by means of the operation of hydrogen abstraction processes. Free radicals derived from the latter monomer and from any of a variety of other sources in the coating compositions can be efficiently quenched by abstraction of a labile allylic or double allylic hydrogen atom in the unsaturated fatty acid residue of the former monomer, thereby forming a much more stable, less reactive allylic or double allylic radical. Extensive monomer polymerization during storage is believed to be thereby prevented, resulting in improved composition storage stability. The well-known phenomenon whereby ethylenic unsaturation in the hydrocarbon side-chains of vinyl and acrylic monomers adversely affects their polymerization capabilities is considered to constitute evidence supporting the aforementioned belief. See S. A. Harrison and D. H. Wheeler, *J. Am. Chem. Soc.*, 73, 839 (1951); W. S. Port, J. E. Hansen, E. F. Jordan, Jr., T. J. Dretz, and D. Swern, *J. Polym. Sci.*, 7, 207 (1951); and S. K. Joshi and P. C. Chattergee, *J. Am. Oil Chem. Soc.*, 55, 607 (1978).

The following examples, in which all parts and percentages are by weight and the temperatures are in centigrade unless otherwise specified, are illustrative of but a few embodiments of the invention.

EXAMPLE 1

Varying proportions of dicyclopentenyloxyethyl methacrylate and methacryloxyethyl ester of linseed oil fatty acids (total monomer weight: 6.0 g) are prepared, mixed thoroughly with 1 wt. % (0.06 g) of a 6 wt. % cobalt solution (cobalt naphthenate in mineral spirits) and cast in aluminum pans. The resulting blends (2–3 mm thick) are then exposed to air, in the dark, at 70° F. and 50% relative humidity. Tack free times and blend cure characteristics are determined by monitoring the samples as a function of time. Ultimate cured film characteristics are also observed. The results are summarized in Table 2.

TABLE 2

Monomer Component Cure Rate and Characteristics

| Monomer Component Composition (wt. %) | Cure Rate As Tack-Free Time (Hrs.) | Cure Characteristics |
|---|---|---|
| A (100) | >28<30 | "bottom-up" |
| A (90)/B (10) | 13 | " |
| A (80)/B (20) | 12 | " |
| A (70)/B (30) | 12 | " |
| A (60)/B (40) | 12 | " |
| A (50)/B (50) | 12 | " |
| B (100) | >16<18 | "top-down" |

A = dicyclopentenyloxyethyl methacrylate
B = methacryloxyethyl ester of linseed oil fatty acids In all cases, the results illustrate that monomer blend compositions cure faster than either of the monomers alone. With respect to final film properties, it is found that the hardness of the cured films increased while flexibility and toughness decreased with increasing monomer A content.

EXAMPLE 2

Blends containing various methacryloxyethyl esters of drying oil fatty acids (20 wt. %) are cured with cobalt naphthenate using the procedure described in example 1. The results are summarized in Table 3.

TABLE 3

Monomer Component Cure Rate

| Monomer Component Composition (wt. %) | Cure Rate As Tack-Free Time (Hrs.) |
|---|---|
| A (100) | >28<30 |
| B (100) | >16<18 |
| A (80)/B (20) | 12 |
| C (100) | 21 |
| A (80)/C (20) | 16 |
| D (100) | 29 |
| A (80)/D (20) | 26 |
| E (100) | 28 |
| A (80)/E (20) | 27 |

A = dicyclopentenyloxyethyl methacrylate
B = methacryloxyethyl ester of linseed oil fatty acids
C = methacryloxyethyl ester of dehydrated castor oil fatty acids
D = methacryloxyethyl ester of soybean oil fatty acids
E = methacryloxyethyl ester of tall oil fatty acids In each instance, the results illustrate that monomer blend compositions cure faster than the respective monomers alone, although the degree of cure enhancement decreases appreciably as the drying capacity (i.e. percentage unsaturation) of the fatty acid residues decreases.

EXAMPLE 3

A clear, high solids, hydrolysis-resistant, unsaturated polyester coating composition is prepared from 60 parts, on solids, of an experimental unsaturated polyester resin[1] and 40 parts of a reactive diluent monomer system. The compositions also contain 0.06 wt. % cobalt (as the naphthenate), 0.25 wt. % Exkin ® #2 (methyl ethyl ketone-oxime, a product of Tenneco Chemicals, Inc.) and 0.025 wt. % SF-1023 (silicone wetting agent, a product of General Electric Co.) on total binder solids (polyester resin and reactive diluent). Films (3 mils) are cast on Bonderite ®-40 panels (cold-rolled steel with a corrosion resistant zinc phosphate coating) at ambient temperature and monitored periodically for tack-free time. The results are presented in Table 4.

TABLE 4

Cure Rate Of An Unsaturated Polyester[1] Coating Composition

| Monomer Component Composition (wt. %) | Cure Rate As Tack-Free Time (Hrs.) |
|---|---|
| A (100) | >48<54 |
| A (90)/B (10) | 28 |
| A (80)/B (20) | >8<24 |

A = dicyclopentenyloxyethyl methacrylate
B = methacryloxyethyl ester of linseed oil fatty acids
[1]Resin prepared from maleic anhydride (45 mole %), adipic acid (5 mole %), neopentyl glycol (37.5 mole %), and 2,2,4-trimethyl-1,3-pentanediol (12.5 mole %); Acid Number: 28; Solids: 85% in n-butyl acetate.

The results illustrate that the use of a monomer blend composition in the polyester coating composition provides a faster curing coating composition than that which is obtained using the monomer, dicyclopentenyloxyethyl methacrylate, alone.

EXAMPLE 4

The clear polyester coating compositions of example 3 are cast as 3 mil films on Bonderite ®-40 panels and then cured either at 165° F. for 30 minutes or at 180° F. for 30 minutes. The Knoop and pencil hardnesses of the cured films, as well as their mar and print resistances, are then determined by standard techniques. The results are summarized in Table 5.

TABLE 5

Properties of Clear Unsaturated Polyester Coatings

| Monomer Component Composition (wt %) | 165° F./30 min. Cure | | | | 180°/30 min. Cure | | | |
|---|---|---|---|---|---|---|---|---|
| | KHN[1] | P.H.[2] | Mar Res.[3] | Print Res.[4] | KHN[1] | P.H.[2] | Mar. Res.[3] | Print Res.[4] |
| A (100) | 2.1 | 3H | Poor | >10 | 2.1 | H | Poor | >10 |
| A(80)/B(20) | 2.5 | 3H | Poor | 5 | 3.5 | 2H | Fair | 6 |
| A(80)/B(20) | 3.3 | 2H | Fair | 4 | 6.2 | 3H | Good | 5 |

A = dicylcopentenyloxyethyl methacrylate
B = methacryloxyethyl ester of linseed oil fatty acids
[1]Knoop Hardness Number
[2]Pencil Hardness
[3]Subjective evaluation of resistance to surface mar when the film is scratched with a fingernail
Poor = Heavy Mar; Fair = Slight Mar; Good = Very Slight Mar
[4]Evaluation of the print caused on a film by a circular layer of cheesecloth, 1" in diameter, when covered with a protective circular disk and subjected to 2 psi at 140° F. for 1 hr.
Ratings: 0 = no print; 1-4 = very light print; 5 = light print; 6-7 = medium print; 8-10 = heavy print.

The use of monomer B clearly improves the surface cure of the unsaturated polyester composition as manifested by the marked increase in mar resistance, print resistance, and film hardness as a function of monomer B content.

EXAMPLE 5

Similar results are obtained using a pigmented polyester coating composition containing 40 parts of $TiO_2$ (duPont R-960 ®) and 60 parts of the coating composition of the polyester/reactive diluent monomer (60/40) of Example 4 when cast as a 1.5-2 mil film on Bonderite ®-40 panels and then cured at 180° F. for 30 minutes. The results are summarized in Table 6.

TABLE 6

Properties of TiO$_2$-Pigmented Unsaturated Polyester Coatings

| Monomer Component Composition (wt. %) | 180° F./30 min. Cure | | |
|---|---|---|---|
| | KHN[1] | Mar. Res.[2] | Print Res.[3] |
| A(100) | 4.91 | Poor | 7 |
| A(90)/B(10) | 3.16 | Good | 4 |
| A(80)/B(20) | 2.28 | Good | 5 |

A = dicyclopentenyloxyethyl methacrylate
B = methacryloxyethyl ester of linseed oil fatty acids
[1]Knoop Hardness Number
[2]Mar Resistance: Poor = Heavy Mar; Good = Very Slight Mar
[3]Print Resistance: 0 = no print; 1-4 = very light print; 5 = light print; 6-7 = medium print; 8-10 = heavy print

EXAMPLE 6

High solids, chlorinated polyisoprene coatings are prepared by mixing the following:

| Component | Composition A | Composition B | Composition C |
|---|---|---|---|
| Alloprene ®x-5[1] | 6.76 | 9.35 | 9.31 |
| Cereclor ®70S[2] | 5.94 | 8.21 | 8.18 |
| Cereclor ®42P[3] | 4.25 | — | — |
| dicyclopentenyloxyethyl methacrylate | 11.86 | 17.55 | 12.25 |
| methacryloxyethyl ester of linseed oil fatty acids | 5.08 | — | 5.25 |
| Hydroquinone (1% in MeOH) | 0.28 | 0.25 | 0.25 |
| Thixatrol ® ST[4] | 1.63 | 1.36 | 1.35 |
| Paraplex ® G-62[5] | 0.41 | 0.18 | 0.18 |
| TiO$_2$, R-960 ®(du Pont) | 22.88 | 19.04 | 18.98 |
| Carbon Black | 0.19 | 0.22 | 0.22 |
| Barytes | 24.64 | 19.58 | 19.51 |
| Xylene | 12.18 | 18.78 | 18.99 |
| Solvesso 100 | 3.06 | 4.72 | 4.77 |
| Cobalt Naphthenate (6% Co$^{2+}$) | 0.84 | 0.76 | 0.76 |
| | 100.00 | 100.00 | 100.00 |
| wt % Non-volatiles | 84.00 | 75.8 | 75.5 |
| vol. % Non-volatiles | 68.8 | 57.6 | 57.7 |
| % PVC | 27.4 | 24.3 | 23.9 |
| ICI Viscosity (Poise) | 2.8 | 2.0 | 2.0 |

[1]Chlorinated polyisoprene rubber containing about 64-65 wt % chlorine; a product of ICI United States, Inc.
[2]Resinous chlorinated paraffin containing about 70 wt % chlorine; a product of ICI United States, Inc.
[3]Chlorinated paraffin containing about 42 wt % chlorine; a product of ICI United States, Inc.
[4]Thixotropic agent; a product of The Baker Castor Oil Company
[5]Epoxidized Soybean Oil; a product of the Rohm and Haas Company The compositions described by formulations B and C are cast on Alodine ® aluminum panels (Q-Panel Company) using a draw-down blade and monitored for tack as a function of time under two sets of temperature conditions: ambient temperatures ranging from 62° F. to 72° F. and sub-ambient temperatures ranging from 32° F. to 53° F. The results are presented in Table 7.

TABLE 7

Properties of Chlorinated Rubber Coatings

| Composition | Dry Film Thickness (mils.) | Set to-Touch Time | | Zapon Tack Free Time (0g) | | Zapon Tack Free Time (500g) | |
|---|---|---|---|---|---|---|---|
| | | Amb. Temp. | Subamb. Temp. | Amb. Temp. | Subamb. Temp. | Amb. Temp. | Subamb. Temp. |
| B | 8.9 | >2<3 hrs | >4<5 hrs | >8<10 hrs | >26<30 hrs | >10<15 hrs | >26<30 hrs* |
| C | 8.9 | >1<2 hrs | >3<4 hrs | >4<5 hrs | >10<15 hrs | >6<7 hrs | >24<26 hrs |

*Film surface still tacky though it passes Zapon test with 0 and 500g weight.

The results illustrate that the compositions containing the blend of reactive diluent monomers (70/30 ratio by weight) clearly cures faster than the corresponding composition containing dicyclopentenyloxyethyl methacrylate alone, irrespective of the method employed in determining tack. The greatest cure advantage is realized at subambient temperatures.

EXAMPLE 7

The storage stabilities of compositions B and C of Example 6 are evaluated at ambient temperature (62° F. to 72° F.) and at 140° F., respectively, in the absence of cobalt drier (uncatalyzed), and at ambient temperature in the presence of cobalt drier using ICI viscosity (shear rate: 10,000 sec$^{-1}$) measurements as the stability criterion.

The results are summarized in Tables 8 and 9.

TABLE 8

Effect of Reactive Diluent Monomer Composition on Storage Stability of Chlorinated Rubber Coating Compositions Without Catalyst Coating Composition ICI Viscosity (Poise)

| | Ambient Temperature - Uncatalyzed | | | | 140° F. - Uncatalyzed | |
|---|---|---|---|---|---|---|
| Composition | Initial | 1 Day | 2 Days | 5 Days | 12 Days | Initial | 2 Days |
| B | 2.05 | 2.05 | 2.10 | 2.10 | 2.10 | 2.05 | 5 |
| C | 2.05 | 2.10 | 2.10 | 2.15 | 2.20 | 2.05 | 4.15 |

TABLE 9

Effect of Reactive Diluent Monomer Composition on Storage Stability of Chlorinated Rubber Coating Compositions With Catalyst Coating Composition ICI Viscosity (Poise)

Ambient Temperature - Catalyzed

| Composition | Initial | 1hr | 2hrs | 3hrs | 4hrs | 5hrs | 6hrs | 7hrs | 8hrs | 24hrs | 48hrs |
|---|---|---|---|---|---|---|---|---|---|---|---|
| B | 2.05 | 2.10 | 2.30 | 2.50 | 2.70 | 2.95 | 3.40 | 4.05 | 5 | — | — |
| C | 2.05 | 2.15 | 2.30 | 2.40 | 2.45 | 2.60 | 2.70 | 2.80 | 2.90 | 4.20 | 5 |

In the two test where statistically significant stability differences are observed (ambient temperature-catalyzed and 140° F.-uncatalyzed), the formulation with the reactive diluent monomer blend was clearly more stable than the corresponding formulation with dicyclopentenyloxyethyl methacrylate alone.

EXAMPLE 8

High solids coating compositions are prepared from an experimental oligomeric polyacrylate[1] and varying blends of reactive diluent monomers as described below. The compositions are cast on Bonderite ®-1000 panels using a 3 mil draw-down blade. Formulations A and B are tack-free within 20 hours at ambient temperature while formulations C and D still exhibit tack after 20 hours. Ultimate film properties are approximated by baking the 20 hr. films at 60° C. for 24 hours. The results are summarized in Table 10.

| | Coating Compositions (wt. %) | | | |
|---|---|---|---|---|
| Component | A | B | C | D |
| Polyacrylate[1] | 60 | 60 | 40 | 40 |
| Methacryloxyethyl ester of linseed oil fatty acids | 30 | 20 | 30 | 20 |
| Dicyclopentenyloxyethyl methacrylate | 10 | 20 | 30 | 40 |
| Cobalt naphthenate | 0.1 | 0.1 | 0.1 | 0.1 |

[1]Acrylated Styrene/allyl alcohol copolymer, MW about 2000 amu., 3.5 meq. acrylate/g., 70% solids in in toluene

TABLE 10

Properties of Polyacrylate Coatings

| Composition | KHN[1] | Rev.Impact in-lbs | Solvent Resistances[2] | | | | |
|---|---|---|---|---|---|---|---|
| | | | MDC[3] (15min) | Acetone (30min) | MeOH (30min) | Toluene (30min) | 10% HoAc[4] (120min) |
| A | 17.7 | <4 | swelled | d,<15min | 1 w | 2 | 1 |
| B | 19.3 | <4 | swelled | d,<15min | 1 w | 2 | 1 |
| C | 15.6 | <4 | swelled | d,<15min | 1 PS | 2 | 1 |

TABLE 10-continued

| | | | | Properties of Polyacrylate Coatings | | | | |
|---|---|---|---|---|---|---|---|---|
| | | | | | Solvent Resistances[2] | | | |
| Composition | KHN[1] | Rev.Impact in-lbs | MDC[3] (15min) | Acetone (30min) | MeOH (30min) | Toluene (30min) | 10% HoAc[4] (120min) | |
| D | 20.2 | <4 | swelled | d,<30min | 1 PS | 2 | 1 | |

[1] Knoop Hardness Number
[2] Squares of cheesecloth saturated with the respective solvents are placed on the cured films (20 hrs/ambient; 24 hrs. 60° C.) and covered with a watch glass. After 30 minutes, the effect of the solvent on the film hardness is evaluated using the following rating systems: 1 = little or no softening, 2 = slight softening, 3 = moderate softening; d = delaminates; w = whitens, PS = partially dissolves.
[3] Methylene dichloride
[4] Acetic acid

EXAMPLE 9

A short oil alkyd coating composition is prepared as follows. A short oil alkyd, RCI®-12-025 (32% dehydrated castor oil, 50% solids in xylene/butyl alcohol; a product of Reichold Chemicals, Inc.), is mixed with 0.05% Mn drier (Dapro® 5005, 1.1% Mn in mineral spirits, a product of Daniels Products Co.) and either dicyclopentenyloxyethyl methacrylate alone or a blend of dicyclopentenyloxyethyl methacrylate and the methacryloxyethyl ester of linseed oil fatty acids (80:20). The resulting mixture is then diluted to 50% solids by the addition of xylene and this coating composition is cast as clear films, having a thickness of 1-1.5 mils, on Bonderite 1000 panels. The resulting films are cured under ambient conditions. The compositions and the properties of the cured films are summarized below. The results show that the use of a reactive diluent monomer system according to the invention provides improved set and tack-free times, improved water resistance and reduced viscosity which permits higher coating solids.

| | Coating Compositions | |
|---|---|---|
| Component | A | B |
| Reichold RCI-12025 | 41.80 | 48.00 |
| Dicyclopentenyloxyethyl methacrylate | 31.40 | 28.80 |
| Methacryloxyethyl ester of linseed fatty acids | — | 2.20 |
| Dapro® 5005 | 2.37 | 2.72 |
| Xylene | 29.03 | 33.28 |
| Total | 104.60 | 120.00 |

TABLE 11

| | | | | | Tack- | | |
|---|---|---|---|---|---|---|---|
| | Monomer | Alkyd/ | | Set | Free | Water | Pencil |
| | Composition | Monomer | Viscosity[1] | Time[2] | Time[3] | Res.[4] | Hardness[5] |
| Composition | (wt/wt) | (wt/wt) | (50% Solids) | (Hrs.) | (Hrs.) | (5days) | (6days) |
| A | A' | 40/60 | A | 24 | 30 | Whitens | H |
| B | A'/B' (80/20) | 40/60 | A-4 | 8 | 24 | Slight Whitening | F |

A' = dicyclopentenyloxyethyl methacrylate
B' = methacryloxyethyl ester of linseed oil fatty acids
[1] Gardner-Holdt Viscosity, 23.5° C.
[2] Set to touch; no film transfer under light pressure
[3] Zapon tack test; 500 g. applied for 5 seconds
[4] Exposure to water for 1 hr. at ambient temperature

What is claimed is:

1. A coating and/or impregnating composition, adapted to be cured in the presence of oxygen, comprising:

(1) from about 5% to about 75% by weight, based on the total of components (1) and (2), of a reactive, non-volatile, diluent monomer system comprising
   (a) from about 1% to about 99% by weight of monomer system of at least one member selected from the group consisting of dicyclopentenyloxyalkyl esters of a polymerizable ethylenically unsaturated monocarboxylic acid or dicarboxylic acid, and
   (b) from about 1% to about 99% by weight of monomer system of at least one member selected from the group consisting of methacryloxyalkyl esters and acryloxyalkyl esters of drying oil, or semi-drying oil, fatty acids;
(2) from about 95% to about 25% by weight, based on the total of components (1) and (2), of a film-forming component selected from the group consisting of
   (a) drying oils,
   (b) film-foring alkyd resins having autoxidative functionality and oil-free polyesters having maleate or fumarate functionality,
   (c) film-forming vinyl addition polymers having ethylenic unsaturation having autoxidizable characteristics selected from those vinyl addition polymers having pendant allylic functionality and those vinyl addition polymers having pendant drying oil functionality,
   (d) film-forming polymeric binders lacking any appreciable inherent autoxidizable functionality, and
   (e) film-forming condensation polymers modified with acrylate or methacrylate functionality, and
(3) an effective amount of a polyvalent metal-containing complex or salt that catalyzes the autoxidative curing at components (1) and (2).

2. The composition of claim 1 further comprising a volatile oxime stabilizer.

3. The composition of claim 1 or 2 wherein the first member, (a), of the reactive, non-volatile, diluent monomer system is represented by the formula

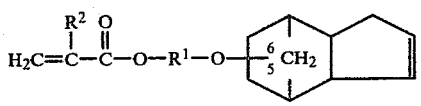

wherein
$R^2$ is selected from the group consisting of H and $CH_3$, and
$R^1$ is selected from the group consisting of
  (a) alkylene groups having 2 to 6 carbon atoms and
  (b) oxaalkylene groups having 4 to 6 carbon atoms and having one or more oxygen atoms joining distinct segments of the alkylene chain, each segment having at least 2 carbon atoms.

4. The composition of claim 1 or 2 wherein the first member, (a), of the reactive, non-volatile diluent monomer system is selected from the group consisting of dicyclopentenyloxyethyl methacrylate and dicyclopentenyloxyethyl acrylate.

5. The composition of claim 1 or 2 wherein the second member, (b), of the reactive, non-volatile, diluent monomer system is represented by the formula

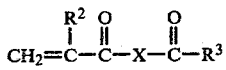

wherein
$R^2$ is selected from the group consisting of H and $CH_3$,
$R^3$ is selected from the group consisting of at least one aliphatic, linear hydrocarbyl radical having 11-23 carbon atoms and containing at least one ethylenic double bond, and
X is selected from the group consisting of
  (a) —$OR^4O$— wherein $R^4$ is an aliphatic or cycloaliphatic hydrocarbon residue containing 2 to 10 carbon atoms, and
  (b) —$O(CH_2CHR^5O)_m$— wherein $R^5$ is H or $CH_3$ and m is an integer of from 2 to 10.

6. The composition of claim 1 or 2 wherein the second member, (b), of the reactive, non-volatile, diluent monomer system is the mixture of monomers obtained from the esterification of linseed oil fatty acids with 2-hydroxyethyl methacrylate which comprise, principally, the methacryloxyethyl esters of oleic acid, linolenic acid and linoleic acid.

7. The composition of claim 1 comprising about 25% to about 60% by weight of total composition of a reactive, non-volatile, diluent monomer system comprising dicyclopentenyloxyethyl methacrylate and the methacryloxyethyl ester of linseed oil fatty acids.

8. The composition of claim 2 comprising about 25% to about 60% by weight of total composition of a reactive, non-volatile diluent monomer system comprising dicyclopentenyloxyethyl methacrylate and the methacryloxyethyl ester of linseed oil fatty acids.

9. the composition of claim 7 or 8 wherein the film-forming component, (2), is an alkyd resin having autoxidative functionality obtained from the use of a member selected from the group of at least one of (a) an ethylenically unsaturated dicarboxylic acid as part or all of the polycarboxylic acid component of the alkyd resin and (b) an unsaturated fatty acid or oil as a component of the alkyd resin.

10. The composition of claim 7 or 8 wherein the film-forming component is a vinyl addition polymer having a molecular weight in the range of 500-15,000 amu and having ethylenic unsaturation therein selected from the group consisting of polymers of allyl methacrylate, allyl acrylate, allyloxyethyl methacrylate, allyloxyethyl acrylate, butadiene, dicyclopentenyloxyethyl methacrylate, and dicyclopentenyloxyethyl acrylate.

11. The composition of claim 7 or 8 wherein the film-forming component is a vinyl addition polymer having a molecular weight in the range of 500-15,000 amu and having ethylenic unsaturation wherein the polymer contains pendant to the chains thereof unsaturated groups of radicals derived from drying oils.

12. The composition of claim 7 or 8 wherein the film-forming component is a thermoplastic vinyl addition polymer of only monoethylenically unsaturated monomers having only a single unsaturated group of the formula

13. The composition of claim 7 or 8 wherein the film-forming component is a thermoplastic vinyl addition polymer selected from the group consisting of (a) solution polymers having a molecular weight in the range of 20,000-350,000 amu, (b) polyvinyl acetals obtained by reacting a polyvinyl acetate under hydrolytic conditions with an aliphatic ($C_2$-$C_8$) aldehyde, and (c) chlorinated rubbers in which there are combined about 64-65% by weight of chlorine.

14. The composition according to claim 7 or 8 wherein the film-forming component is a film-forming condensation polymer comprising an isocyanate prepolymer having no free —NCO groups, the isocyanate prepolymer being derived from polyethers and polyesters and an organic polyisocyanate coupled with a hydroxyalkyl acrylate or methacrylate.

15. The composition of claim 7 or 8 wherein the film-forming component is an acrylated or methacrylated isocyanate-terminated prepolymer wherein all free isocyanate groups of the prepolymer have been reacted with a monoethylenically unsaturated monomer having a reactive hydrogen atom, the reactive hydrogen atom-containing monomer being selected from the group consisting of hydroxyalkyl acrylates and hydroxyalkyl methacrylates.

16. The composition of claim 7 or 8 wherein the film-forming component is a film-forming condensate of one of acrylic acid and methacrylic acid with a hydroxy-terminated polyether or polyester.

17. A cured article comprising a substrate coated by the composition of claim 1 wherein the coating is cured by autoxidation in the presence of oxygen.

18. A cured article comprising a substrate coated by the composition of claim 2 wherein the coating is cured by autoxidation in the presence of oxygen.

19. A cured article comprising a substrate coated by the composition of claim 7 wherein the coating is cured by autoxidation in the presence of oxygen.

20. A cured article comprising a substrate coated by the composition of claim 8 wherein the coating is cured by autoxidation in the presence of oxygen.

* * * * *